Aug. 5, 1969     J. T. PARSONS, SR     3,459,104
ROUTER ATTACHMENT APPARATUS
Filed Dec. 27, 1967     2 Sheets-Sheet 1

INVENTOR.
JOE T. PARSONS, SR.
BY John R. Walker, III
Attorney

Aug. 5, 1969     J. T. PARSONS, SR     3,459,104
ROUTER ATTACHMENT APPARATUS
Filed Dec. 27, 1967     2 Sheets-Sheet 2
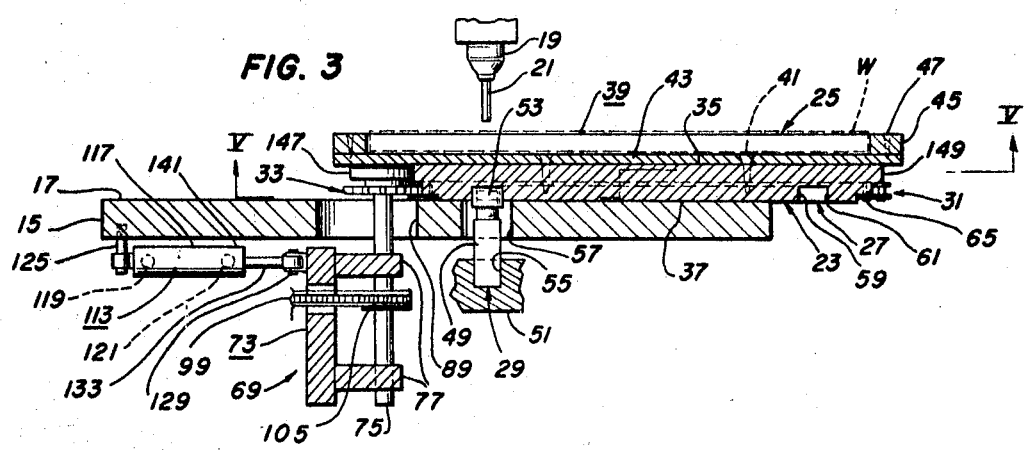
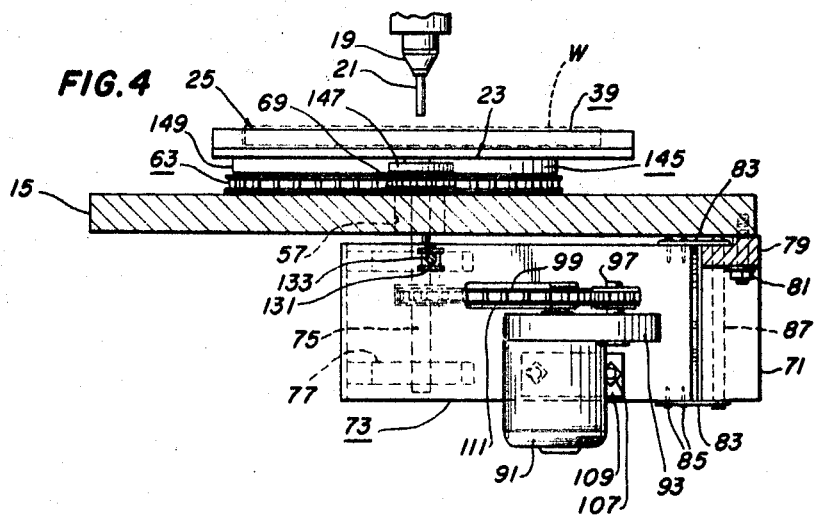
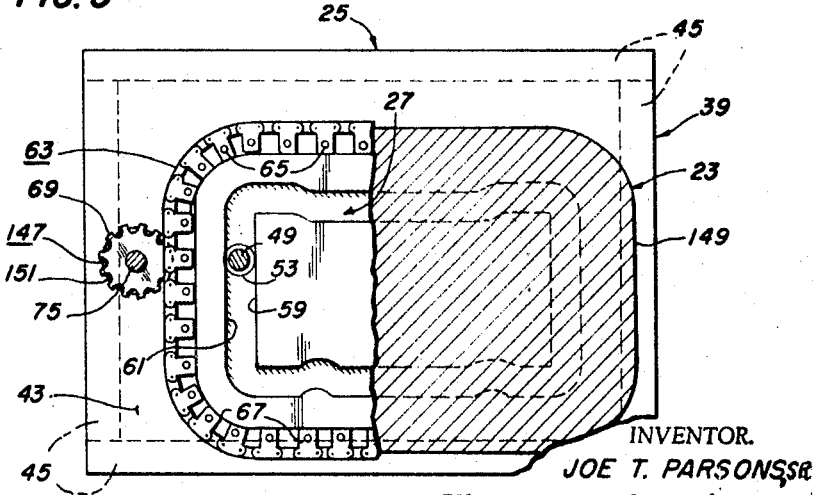
INVENTOR.
JOE T. PARSONS,SR.
BY John R. Walker, III
Attorney United States Patent Office 3,459,104
Patented Aug. 5, 1969

3,459,104
ROUTER ATTACHMENT APPARATUS
Joe T. Parsons, Sr., 1200 W. Hale, Osceola, Ark. 72370
Filed Dec. 27, 1967, Ser. No. 693,823
Int. Cl. B23c 1/16, 1/18; B27c 5/00
U.S. Cl. 90—13
10 Claims

ABSTRACT OF THE DISCLOSURE

Attachment means for attachment on a heavy-duty production type router machine or similar machine having a work table and vertically operable cutter bit carrying spindle means. The attachment means being especially useful for broadwise cutting generally flat workpieces of material. The attachment apparatus being adapted to be set up for making piercing cut inside cut-outs, inlet routing, top-edge routing, or contour edge routing. A flat workpiece-supporting body having a pre-patterned guideway is adapted to be moved along a guide pin roller projecting above the work table of the router machine. The guide pin roller and router cutter being in vertical coaxial alignment. The invention provides a semi-automatically operative feed means for guidingly, drivingly, shiftably moving a workpiece horizontally under the router cutter head for cutting a desired cut or contour broadwise in a workpiece.

BACKGROUND OF THE INVENTION

Field of the invention

Relates to attachment devices for heavy-duty production type router machines or the like for broadwise cutting generally flat workpieces of material.

Description of the prior art

In many of the above-mentioned routing operations the workpieces are hand-fed under a horizontally fixed cutter head. The typical way of routing flat workpieces of material is by manually sliding the workpiece along the work surface of the router table. The workpiece is fed along a fence for straightline work, or along a template held against a guide pin for contour work. For making running piercing cuts in a flat workpiece a workpiece mounted template pattern having a slotted bottom is hand-fed under the cutter head. The pattern or configuration of the slot in the bottom of the template causes a like configuration of cut in the upper surface of the workpiece.

In the prior art, hand feeding an industrial or a production type router machine presented several problems: To operate such a machine efficiently, a workman of considerable skill and proficiency was needed. Also, such work was slow and tedious and the production rate was substantially limited. A further problem was in obtaining smooth uniform cuts in a workpiece. Since in hand feeding a workpiece, the workpiece is usually not moved continuously as a cut is being made, imperfections in the cut surface often occurred each time the workpiece travel was stopped or started. This of course detracted from the finished product and often necessitated additional surfacing or finishing work.

SUMMARY OF THE INVENTION

Broadly, the invention may be thought of as providing mechanical feed means for the old fixed-guide pin, slot-patterned-template routing set-up, and in such routing set-ups wherein the router cutter bit is in vertical coaxial alignment with the guide pin.

BRIEF DESCRIPTION OF THE DRAWING

FIG. 3 is a vertical plane sectional view taken as on the line III—III of FIG. 2.

FIG. 4 is a vertical plane sectional view taken as on the line IV—IV of FIG. 2.

FIG. 5 is a horizontal broken plane sectional view, viewed upwardly and taken as on the line V—V of FIG. 3.

DESCRIPTION OF THE PREFERRED EMBODIMENT

Figure 1:
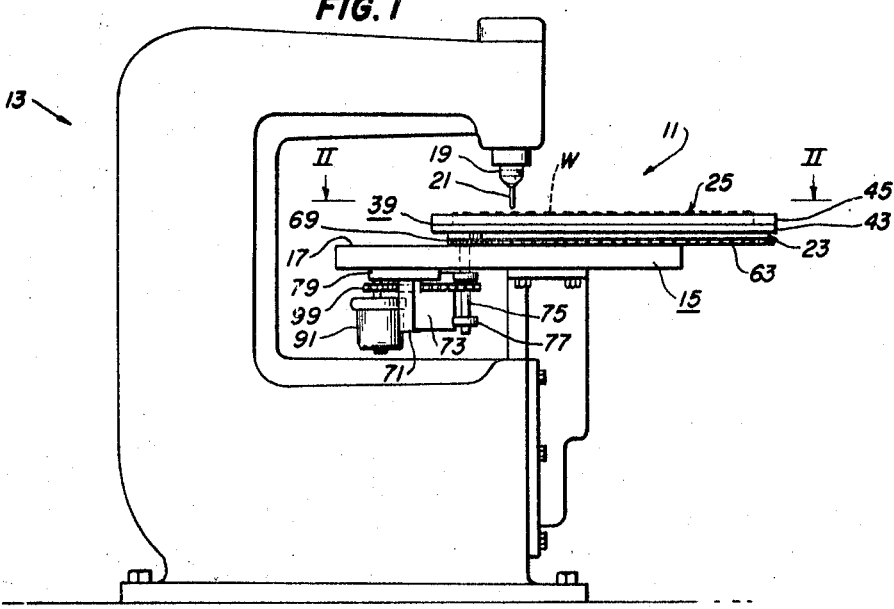
FIG. 1 is an environmental somewhat schematic view of the attachment apparatus of the present invention attached on a router machine.
Figure 2:
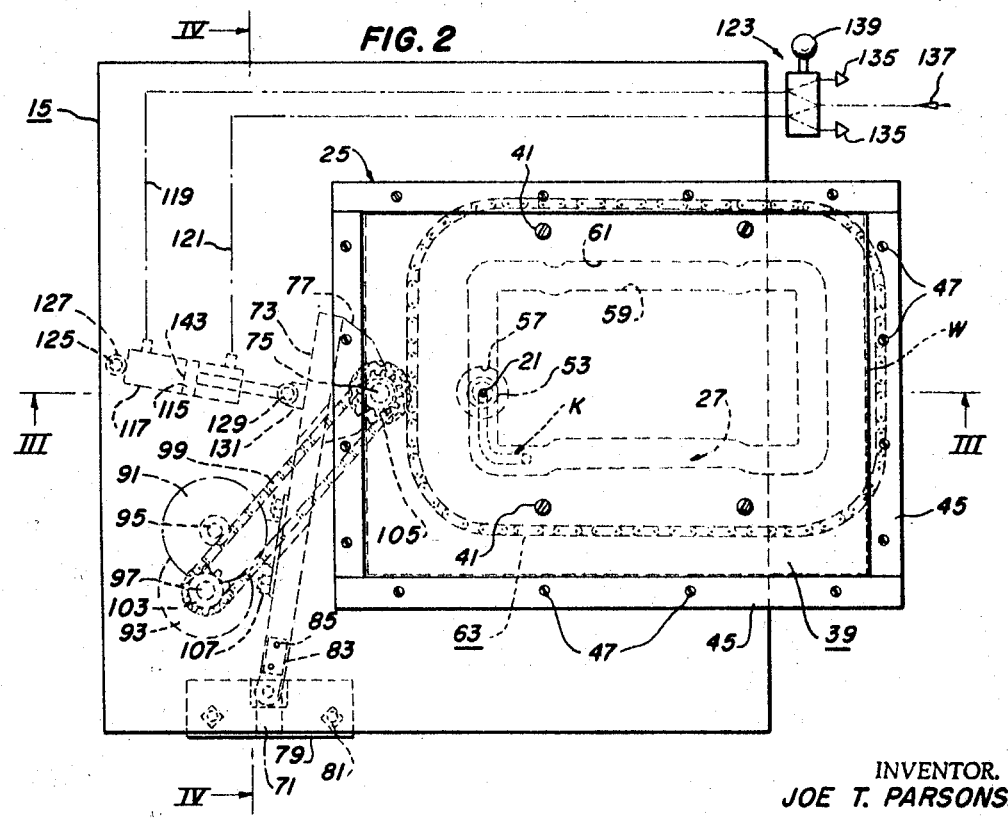
FIG. 2 is a top view of the router attachment apparatus taken as on the line II—II of FIG. 1.

The attachment apparatus of the present invention is indicated by numeral 11, and is illustrated and will be described in conjunction with a typical production-type router 13 having a work table 15 having a work surface 17, and cutter head means including a spindle 19 and cutter bit 21. Moreover, a typical piercing-cut type router bit is illustrated, and the following description will describe the apparatus set-up in such a manner as being adapted for making a running piercing cut in a panel-shaped workpiece W. It will be understood that although a router 13 is shown in which work table 15 is stationary and the spindle 19 and cutter bit 21 are movable vertically to bring the cutter bit into and out of engagement with the work piece, other types of routers may be used in which the spindle and cutter bit are held vertically fixed and the work table is moved to bring the work piece into engagement with the cutter bit, without departing from the spirit and scope of the present invention. The kerf, or path of cut of cutter bit 21 in workpiece W is indicated by letter K in FIG. 2 (indicated in dotted lines). Kerf K indicates a kerf cut made in workpiece W as the workpiece is moved generally counterclockwise under the horizontally fixed cutter bit.

The basic structural components of attachment 11 include a generally flat body 23; workpiece securing means 25 for removably securing workpiece W on body 23; guideway means arranged on the underside of body 23; guide pin means 29 arranged on router table 15 and co-acting with guideway 27; cogged trackway means 31 arranged horizontally and around the periphery of body 23; and shiftable cogwheel means 33 drivingly engageable with cogged trackway means 31.

Body 23 is panel-like and generally rectangular in configuration and includes generally flat upper and lower surfaces 35, 37 respectively. Body 23 is adapted to be supported on router table 15 with undersurface 37 of the body slidingly restingly engaging work surface 17 of the router table.

Workpiece securing means 25 principally includes a workpiece-supporting jig 39 detachably secured superjacently on body 23 by screw fasteners 41. Jig 39 is adapted to removably receive workpiece W and includes a broad panel-like base member 43 arranged horizontally, and a plurality of upstanding fence members 45 arranged around the periphery of jig base member 43 and attached by screw fasteners 47 to base member 43. When router machining a series of workpieces W, each workpiece is removably positioned in jig 39 with the peripheral edge surfaces of the workpiece abuttingly removably engaging fence members 45.

Guideway structure 27 is preferably integrally formed of body 23 and is pre-patterned to a desired configuration for forming a like configured cut in workpiece W. It will be understood that the generally rectangular configuration of guideway 27, as illustrated in the drawings, is by way of example only and the desired cut in a workpiece will substantially determine the longitudinal configuration of the guideway.

Guide pin means 29 preferably includes a vertical guide shaft 49 removably supported on router frame 51 and a roller member 53 journalled by anti-friction bearing means on the upper end portion of guide shaft 49. The lower end portion of guide shaft 49 may be removably received as in a socket opening 55 provided in router frame 51. Guide shaft 49 projects upwardly through a circular opening 57 in router table 15 and in such a manner that the cylindrical working surface of roller 53 is arranged substantially above the level of work table surface 17. Roller 53 is adapted to snugly but freely project upwardly into guideway 27 in attachment body 23. The opposite cylindrical surface portions of roller 53 is adapted to rollingly engage confronting lateral wall surfaces 59, 61 of guideway 27. The axes respectively of router bit 21 and roller 53 are in coaxial arrangement and workpiece-supporting body 23 may be freely horizontally pivoted on work table 15. It will be understood that in the operation of the inventive structure, the above-mentioned free pivotal movement of body 23 is not exhibited and workpiece-supporting body 23 will substantially be driven and guided by cogwheel and trackway means 33, 31.

Cogged trackway means 31 preferably includes a roller-type chain 63 fixedly secured to and extending continuously about the periphery of body 23. Roller chain 63 is fixedly secured around the lower circumferential portion of body 23 and faces horizontally outwardly from the body. Roller chain 63 is secured along the lower side thereof with a series of fastening screws 65. Each of the pin link lower plates of roller chain 63 is provided with a flat lobe portion 67 projecting inwardly of the roller chain. A downwardly facing cut-out portion extending along the periphery of body 23 fixedly receives lobe portions 67 of roller chain 63. Headed screw fasteners 65 extend vertically upwardly through lobe portions 67 and are embeddedly secured in body 23. Chain 63 is preferably uniformly spaced from guideway 27 along a substantial portion of the guideway. Roller chain 63 also preferably extends generally concentrically with guideway 27 at the four corner portions of body 23. Cogwheel means 33 preferably is in the form of a sprocket wheel 69 and with the sprocket wheel and chain 63 having mating surfaces adapted for power transmission engagement.

Sprocket wheel 69 is preferably shiftably mounted from router table 15. Sprocket wheel 69 is adapted to be selectively shifted to and from a first position wherein the cogwheel is in tangential driving engagement with cogged trackway 31 and a second position wherein sprocket wheel 69 is disengaged from the trackway. The sprocket wheel mounting means basically includes a post structure 71 removably mounted on the underside of router table 15; a horizontal arm 73 pivotally supported cantilever fashion from post 71; a cogwheel shaft 75 and bearing members 77 mounting the shaft on the distal end of arm 73. The means removably securing post 71 on router table 15 include a horizontal cap piece 79 fixedly secured on the upper end of post 71 and threaded fasteners 81 removably extending through an edge portion of router table 15 and cap piece 79. Upper and lower pivot plates 83 attached on the proximal end portion of arm 73 by screws 85, and a pivot pin 87 pivotally secure arm 73 on post 71 for pivot about a vertical axis. Pin 87 extending through vertical apertures respectively in plates 83 and post 71 provides pivotal shifting movement of arm 73 and of sprocket wheel 69 toward and away from trackway roller chain 63. A slotted vertical opening 89 in router table 15 provides passageway means for sprocket wheel shaft 75 and permits the shaft and sprocket wheel to be shifted toward and away from attachment body 23 and trackway chain 63.

Sprocket wheel drive means basically includes an electric motor 91; speed reduction gearbox means 93 including input and output shafts 95, 97; and chain and sprocket means 99, 103, 105. Motor 91 and gearbox means 93 preferably are of integral construction well-known to those in the art. Threaded fasteners 107 extending through arm 73 and base plate 109 of motor 91 vertically mounts motor 91 and gearbox means 93 on the opposite side of arm 73 from cogwheel shaft 75. Sprocket 103 mounted on gearbox output shaft 97; sprocket 105 mounted on shaft 75; and chain 99 interconnecting sprockets 103, 105 drive sprocket wheel 69 for driving engagement of the wheel with trackway chain 63. Sprockets 103, 105 preferably are arranged on opposite sides of arm 73 and an aperture 111 is provided in the arm for passage of chain 99.

The means for shifting sprocket wheel 69 to and from engagement with trackway 31 basically includes a double-acting piston-cylinder assembly 113 including a piston 115 and a cylinder 117; and includes conduit means 119, 121 and valve means 123.

A pin 125 is removably fixed in the underside of router table 15 and pivotally receives a bushing 127 fixed on the base end of cylinder 117. Pin and bushing means 125, 127 provides means for biasing piston-cylinder assembly 113 from router table 15. A pin 129 and yoke 131 fixed respectively on the distal end of piston rod 133 and arm 73 articulatingly connects cylinder assembly 113 and arm 73. Extending or retracting movement of piston-cylinder assembly 113 shiftably moves sprocket wheel 69 into and from engagement with trackway structure roller chain 63.

Valve means 123 is of the typical hand-operative five-port type having exhaust ports 135 and is connected through feed line means with a compressed air source 137. A knob 139 provides handgrip means for manual actuation of valve means 123. Moving knob 139 inwardly or outwardly controls the actuation of cylinder assembly 113: Pushing inwardly on knob 139 arranges piston-cylinder assembly 113 in an extended disposition and engages sprocket wheel 69 with roller chain 63. Pulling outwardly on knob 139 arranges piston-cylinder assembly 113 in a retracted disposition and disengages sprocket wheel 69 from roller chain 63.

Pressure means, operative when sprocket wheel 69 is in engagement with trackway chain 63, is provided for exerting a substantially constant force on the sprocket wheel and against the trackway. As sprocket wheel 69 is driving trackway chain 63, and thus body 23, there is considerable variation in the distance between the fixed axis of guide roller 53 and the axis of sprocket wheel 69. As a running cut is being formed in workpiece W, attachment body 23 slidingly revolves around the axis of guide pin roller 53 and the body and sprocket wheel may simultaneously shift relative to the axis of the guide pin roller. The pressure means of the attachment apparatus thus provides means for exerting substantially constant radial force on sprocket wheel 69 and for holding the sprocket wheel in constant engagement with trackway chain 63.

Preferably, though not necessarily, the pressure means is incorporated in the compressed air means of the attachment apparatus. Although it is contemplated that force means such as mechanical spring means may be used in certain applications of the invention for yieldably holding sprocket wheel 69 in engagement with trackway chain 63, the preferred force or pressure means for accomplishing this function is coupled with the means for pivotally shifting arm and sprocket wheel 69, 73. The size, shape, and arrangement of the pertinent parts of the apparatus is such that, as a running cut is being formed in a workpiece, piston 115 in piston-cylinder assembly 113 never abuttingly engages or bottoms against head 141 of cylinder 117. This is so regardless of the configuration of guideway 27. The air pressure on face surface 143 of cylinder piston 115, and thus the air pressure of the air source substantially determines the radial force exerted by sprocket wheel 69 against trackway chain 63. In certain applications of the apparatus it may be desirable to interposedly fit an air pressure regulator (not shown) in infeed conduit 119 for regulating the radial force of wheel 69 against chain 63.

Preferably, though not necessarily, the attachment apparatus includes pilot means including a pilot trackway 145 extending generally along the horizontal periphery of body 23 and a pilot wheel 147 mounted in coaxial arrangement with and directly above sprocket wheel 69. Trackway 145 and wheel 147 are provided respectively with smooth running surfaces adapted for coacting engagement: Trackway 145 is defined substantially by a smooth vertical running surface 149 extending circumferentially about body 23. Wheel 147 is provided with a smooth circular rim surface 151 adapted for running engagement with surface 149 of trackway 145. The size, shape and arrangement respectively of roller chain 63, sprocket wheel 69, trackway 145 and wheel 147 is such that when the respective parts are in operative engagement, the engaging surface portions of smooth running surfaces 149, 151 respectively of trackway and wheel 145, 147 are in vertical alignment with the imaginary pitchline between sprocket wheel 69 and roller chain 63. The pitch line of trackway sprocket 69 is substantially diametrically the same as the running surface of wheel 147. In operation, wheel 147 rollingly carries the radial force exerted on sprocket wheel 69 by the compressed air pressure means and permits the sprocket wheel to function mainly for driving body 23 and with substantially no radial compression in the sprocket wheel. Trackway and wheel means 145, 147 permits a smoother cut to be made in workpiece W by permitting a smoother driving action on body 23.

Although body 23 and guideway 27 have been illustrated as being generally rectangular, it is, of course, apparent that other peripheral configurations of these parts may be desired in certain router machine set-ups. It is contemplated that trackway means 31 may be configured with an S-curve along one side or may be configured circular without departing from the invention. It is, of course, apparent that the configuration of guideway 27 will be determined substantially by the configuration of the running cut desired in workpiece W. Although the invention has been illustrated and described as being in a router type set-up for making a running piercing cut cut-out in a workpiece, it is contemplated that the invention may be useful for many other router type operations making running cuts in a broad workpiece. It is contemplated that with suitable shaper or molding type cutting bits the apparatus may be effectively used in contour forming an edge, particularly an upper edge, of a workpiece.

The following is briefly a description of apparatus 11 after a body 23 having a desired combination of guideway configuration and workpiece-securing jig means is selected: Knob 139 of valve means 123 is pulled outwardly, thereby actuating cylinder assembly 113 and moving sprocket wheel 69 outwardly from trackway roller chain 63. Electric motor 91 may be energized and sprocket wheel 69 continuously rotated. With the sprocket wheel moved outwardly away from guide pin means 29, the selected body 23 having the desired guideway configuration and workpiece supporting jig is placed flatwise on router table work surface 17 with guide pin roller 53 projecting upwardly in the guideway 27 of the body 23. A workpiece W is then positioned in the jig 39. The router cutterhead is lowered and the cutter bit vertically moved downwardly to make a piercing bore-cut into the workpiece. Knob 139 of the valve means is then moved inwardly actuating piston-cylinder assembly 113 and thereby moving rotating sprocket wheel 69 into dog-clutch-like positive drive engagement with trackway chain 63. The engagement of the chain and sprocket causes the body 23 to tend to move about guide pin roller 53, thereby moving the body and workpiece under the router cutter head and forming the piercing running cut in the workpiece. In making a full inside cut-out in a workpiece, the body and workpiece will be moved circularly in a complete circuit. The inside cut-out portion and workpiece may then be moved from the jig.

Although a preferred embodiment of the invention has been illustrated and described, it will be understood that various changes and modifications in structure may be made without departing from the spirit and scope of the invention as defined in the claims.

I claim:
1. For use with a production type router or like machine having a work table horizontal work surface, having vertical cutter bit carrying spindle means arranged over said work surface, and having means operably adapted for causing vertical relative movement of said work table and said work surface: apparatus attachable on said machine for broadwise contour cutting a generally broad work piece comprising a substantially flat body having a generally planar undersurface, said body being adapted for arrangement with said undersurface being flatwise contiguous said work table work surface, workpiece securing means for firmly removably securing said workpiece superjacently horizontally on said body, channel-shaped guideway structure arranged in said body and extending horizontally circumferentially in spaced arrangement with the circumferential periphery of said body and opening downwardly confrontingly relative to the work surface of said table, guide pin means fixed relative to and projecting above said work table horizontal surface adapted to snugly but freely project upwardly into said guideway structure, a cogged trackway extending horizontally generally along the circumferential periphery of said body and facing horizontally outwardly from said body, a cogwheel, means mounting said cogwheel on a horizontal shiftable vertical axis, said cogwheel being adapted to be selectively shifted to and from a first position wherein said cogwheel is in a tangential driving arrangement with said cogged trackway and a second position wherein said cogwheel is disengaged and spaced from said trackway, selectively controllable drive means adapted for continuously driving said cogwheel, selectively controllable shifting means adapted for shifting said cogwheel to and from said first and second positions, and pressure means operative when said cogwheel is in said first position for yieldably exerting substantially constant radial force on the axis of said cogwheel in a direction toward said trackway.

2. An apparatus according to claim 1 wherein said body is substantially solid and panel-like in form and wherein said guideway structure is substantially integrally formed of said body.

3. An apparatus according to claim 1 wherein said workpiece securing means includes a workpiece-supporting jig detachably secured on said body and with said jig including upstanding peripheral fence structure adapted to abuttingly removably engage the peripheral edge surfaces of said workpiece.

4. An apparatus according to claim 1 wherein said guide pin means includes a vertical guide shaft, a cylindrical roller mounted on the upper end of said shaft, and means supporting said shaft in fixed arrangement relative to said table with the cylindrical working surface of said roller being arranged above the level of said work table work surface; the opposite cylindrical surface portions of said roller being adapted to rollingly engage confronting lateral wall surfaces of said channel-shaped guideway.

5. An apparatus according to claim 1 wherein said cogged trackway is in the form of a roller chain firmly secured on the periphery of said body and wherein said cogwheel is in the form of a sprocket wheel, said sprocket wheel and chain having surfaces adapted for mating power transmission engagement.

6. An apparatus according to claim 1 wherein said means mounting said cogwheel includes post means removably mounted on the underside of said table, a horizontal arm pivotally supported cantilever fashion from said post means, a vertical cogwheel shaft fixedly connecting and extending downwardly from said cogwheel, and bearing means mounting said shaft on the distal end of said arm; said arm, shaft and cogwheel being adapted for shifting pivotal horizontal movement together.

7. An apparatus according to claim 6 wherein said drive means includes an electric motor supported on said arm, speed reduction gearbox means including an input shaft connected with said motor and an output shaft, and chain and sprocket means drivingly interconnecting said output shaft and said cogwheel shaft.

8. An apparatus according to claim 1 wherein said shifting means includes a double-acting compressed air piston-cylinder assembly articulatingly interconnected between said table and said arm and adapted for movement of said cogwheel to and from said first and second positions, conduit means connecting said piston-cylinder assembly to a source of compressed air, and manually operative valve means interposed in said conduit means for selective extension or retractive movement of said piston-cylinder assembly.

9. An apparatus according to claim 8 wherein said pressure means includes means whereby when said cogwheel is in said first position, said piston-cylinder assembly is not fully extended and the compressibility of the operating air acting on the piston of said piston-cylinder assembly provides resilient force means for yieldably exerting substantially constant radial force on the axis of said cogwheel in a direction toward said trackway.

10. An apparatus according to claim 9 which additionally includes pilot means including a pilot trackway secured to and extending generally along the horizontal periphery of said body in vertically spaced arrangement with said cogged trackway and including a smooth running surface facing horizontally outwardly from said body, and including a pilot wheel mounted on the vertical axis of said cogwheel shaft having a smooth circular rim surface adapted to runningly engage the running surface of said pilot trackway; the relative configurations and the arrangement of said cogged trackway and cogwheel, and of said pilot trackway and pilot wheel, being such that said pilot wheel rollingly carries the radial force exterted on said cogwheel axis by said pressure means and permits said cogwheel to drive said body with substantially no radial compression stress in said cogwheel.

References Cited

UNITED STATES PATENTS

| | | | |
|---|---|---|---|
| 1,600,261 | 9/1926 | Whitney | 144—145 |
| 2,722,957 | 11/1955 | Marvosh | 144—134 |
| 3,187,634 | 6/1965 | Onsrud et al. | 90—13 |

GERALD A. DOST, Primary Examiner.

U.S. Cl. X.R.

144—145